United States Patent
Pickering

(10) Patent No.: US 6,601,029 B1
(45) Date of Patent: Jul. 29, 2003

(54) VOICE PROCESSING APPARATUS

(75) Inventor: John Brian Pickering, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/532,103

(22) Filed: Mar. 21, 2000

(30) Foreign Application Priority Data

Dec. 11, 1999 (GB) .............................................. 9929284

(51) Int. Cl.$^7$ .............................................. G10L 15/00
(52) U.S. Cl. ...................... 704/257; 704/275
(58) Field of Search .............................. 704/275, 200, 704/231, 235, 246, 251, 256, 257, 261; 379/67.1, 75, 88.01, 88.04

(56) References Cited

U.S. PATENT DOCUMENTS

| | | | | |
|---|---|---|---|---|
| 5,146,503 A | * | 9/1992 | Cameron et al. ............ | 704/255 |
| 5,301,227 A | * | 4/1994 | Kamei et al. ................. | 379/88 |
| 5,577,165 A | * | 11/1996 | Takebayashi et al. ....... | 704/275 |
| 5,893,902 A | * | 4/1999 | Transue et al. .............. | 704/275 |
| 5,960,447 A | * | 9/1999 | Holt et al. ................... | 707/500 |
| 6,044,347 A | * | 3/2000 | Abella et al. ................ | 704/272 |
| 6,094,476 A | * | 7/2000 | Hunt et al. .............. | 379/88.04 |
| 6,246,981 B1 | * | 6/2001 | Papineni et al. ............ | 704/235 |
| 6,314,398 B1 | * | 11/2001 | Junqua et al. .............. | 704/257 |

FOREIGN PATENT DOCUMENTS

| | | |
|---|---|---|
| GB | 2280820 A | 2/1995 |
| GB | 2305830 | 4/1997 |
| WO | WOX 96/25733 | 8/1996 |

OTHER PUBLICATIONS

McRoy, Susan W., "Building Intelligent Dialog Systems," Intelligence, Spring 1999, University of Wisconsin (Milwaukee), p. 14–23.

Sparks, Randall, "An Object–Oriented Approach to Dialogue Management in Spoken Language Systems," Human Factors in Computing Systems, p. 211–217, (April 24, 1994).

* cited by examiner

Primary Examiner—Daniel Abebe
(74) Attorney, Agent, or Firm—J. Bruce Schelkopf; Kunzler and Associates

(57) ABSTRACT

A voice processing system receives spoken input from a user, which is then subjected to speech recognition to convert the spoken input into a text equivalent. At least two information elements are identified in the text equivalent, each having an associated uncertainty. The system selects a prompt according to which information element has the greatest uncertainty, and this is then played out to the user. Typically the outgoing prompt is arranged to emphasise, via word order, volume, or some other mechanism, the information element in greatest doubt, thereby bringing it to the particular attention of the user, should correction be required.

27 Claims, 3 Drawing Sheets

VOICE PROCESSING APPARATUS

BACKGROUND OF THE INVENTION

1. Field of the Invention

The present invention relates to voice processing apparatus and the like, and more particularly to voice processing systems that use speech recognition.

2. Description of the Related Art

Voice processing systems whereby callers interact over a telephone network (e.g. PSTN or Internet) with computerised equipment are very well-known in the art, and include voice mail systems, voice response units, and so on. Typically such systems ask a caller questions using prompts formed from one or more prerecorded audio segments, and the caller inputs answers by pressing dual tone multiple frequency (DTMF) keys on their telephones. This approach has proved effective for simple interactions, but is clearly restricted in scope due to the limited number of available keys on a telephone. For example, alphabetical input is particularly difficult using DTMF keys.

There has therefore been an increasing tendency in recent years for voice processing systems to use speech recognition in order to augment DTMF input (N.B. the terms speech recognition and voice recognition are used interchangeably herein to denote the act of converting a spoken audio signal into text). The utilisation of speech recognition permits the handling of callers who do not have a DTMF phone, and also the acquisition of more complex information beyond simple numerals from the caller.

As an illustration of the above, WO96/25733 describes a voice response system which includes a prompt unit, a Voice Activity Detector (VAD), and a voice recognition unit. In this system, as a prompt is played to the caller, any input from the caller is passed to the VAD, together with the output from the prompt unit. This allows the VAD to perform echo cancellation on the incoming signal. Then, in response to the detection of voice by the VAD, the prompt is discontinued, and the caller input is switched to the recognition unit, thereby providing a barge-in facility.

Speech recognition in a telephony environment can be supported by a variety of hardware architectures. Many voice processing systems include a special DSP card for running speech recognition software. This card is connected to a line interface unit for the transfer of telephony data by a time division multiplex (TDM) bus. Most commercial voice processing systems, more particularly their line interface units and DSP cards, conform to one of two standard architectures: either the Signal Computing System Architecture (SCSA), or the Multi-vendor Integration Protocol (MVIP). A somewhat different configuration is described in GB 2280820, in which a voice processing system is connected via a local area network to a remote server, which provides a speech recognition facility. This approach is somewhat more complex than the TDM approach, given the data communication and management required, but does offer significantly increased flexibility.

Speech recognition systems are generally used in telephony environments as cost-effective substitutes for human agents, and are adequate for performing simple, routine tasks. It is important that such tasks be performed accurately, otherwise there may be significant caller dissatisfaction, and also as quickly as possible, both to improve caller throughput, and because the owner of the voice processing system is often paying for the call via some freephone mechanism (eg an 0800 number), or because an outbound application is involved.

(Note that as used herein, the term "caller" simply indicates the party at the opposite end of a telephone connection to the voice processing system, rather than to specify which party actually initiated the telephone connection).

There has been an increase in recent years in the complexity of input permitted from the caller. This is supported firstly by the use of large vocabulary recognition systems, and secondly by supporting natural language understanding and dialogue management. As a simple example of this, a pizza ordering application several years ago might have gone through a menu to determine the desired pizza size, topping etc., with one prompt to elicit each property of the pizza from a caller. Now however, such an application may simply ask: "What type of pizza would you like?". The caller response is passed to a large vocabulary speech recognition unit, with the recognised text then being processed in order to extract the relevant information describing the pizza.

The extraction of such information is typically performed by a natural language understanding (NLU) unit working in conjunction with a dialogue manager. These units have knowledge of grammar and syntax, which allows them to parse a caller response such as "I would like a large pizza with pepperoni" to extract the particular information desired by the application, namely that the desired pizza (a) is large, and (b) has a pepperoni topping.

Such natural language processing and dialogue management is described in "Building Intelligent Dialog Systems" by S McRoy, S Ali, A Restificar, and S Channarukul, in Intelligence, Spring 99, p14–23, and (at a more practical level) in "An Object-Oriented Approach to Dialogue Management in Spoken Language Systems" by R Sparks, L Meiskey, and H Brunner, in Human Factors in Computing Systems, 1994, p211–217.

The above approach presents a much more natural interface for callers, provides greater flexibility, and potentially can significantly reduce call handling time. However, large vocabulary speech recognition is still not completely reliable in all cases. Therefore, it is common when the statistical confidence on the recognition result is low, to play back to the caller their selection for confirmation. Whilst this leads to a more robust system, the approach taken by current systems can seem rather robotic, and does not lead to the most efficient dialogue with the caller.

SUMMARY OF THE INVENTION

Accordingly, the invention provides a method of operating a voice processing system comprising the steps of:
receiving spoken input from a user;
performing speech recognition to convert said spoken input into text equivalent;
identifying at least two information elements in said text equivalent, each having an uncertainty associated therewith;
selecting a prompt according to which of said at least two information elements has the greatest uncertainty associated therewith; and
playing out said selected prompt to the user.

Voice applications involving speech recognition frequently play back user input for confirmation. Therefore, according to the invention, where the user has input two items, these are ranked in terms of uncertainty (typically based on the speech recognition confidence level associated with that information element). The playback prompt is then structured to account for which information element has the greatest uncertainty associated with it. This helps structure the playback to maximise the efficiency of the confirmation process.

Thus in particular, in the preferred embodiment, the prompt is selected from a set of two or more possible prompts, each possible prompt containing the same information but having different emphasis. The different emphasis is typically achieved by varying prompt word order, but other parameters can be used instead, such as varying the volume and/or duration and/or pitch of one or more words in the prompt. This selection can be generally achieved by providing multiple pre-recorded prompts, by re-ordering or processing of individual audio segments forming a prompt, or by using a text to speech synthesis system with appropriate parameter settings.

The effect of such different emphasis is to focus user attention on the information element having the greatest uncertainty. This means that he/she is more likely to notice if a mistake has been made in the recognition or identification of the information elements. In addition, he/she is also more likely to stress the incorrect element in any repetition of the input, thereby improving the chances of performing a correct recognition the next time.

Where such repeat input is received, this is typically processed as for the previous input, in other words by performing speech recognition and identifying at least two information elements from this repeat input. In the preferred embodiment, an error condition is obtained if the uncertainty associated with the information elements in such repeat input is greater than that for the previous input, since this indicates that the recognition performance is diverging (deteriorating). Typically at this point automated interaction with the user is terminated, and they are passed to a human agent for handling.

The invention typically finds application in a telephony environment, in which the voice processing system and the user communicate with each other over a telephone network. In this situation, the spoken input is received over a telephone connection, and the prompt is played out over the telephone connection. Note that the audio qualities of a telephone connection can be somewhat variable, which is one of the reasons why speech recognition in this environment is often subject to uncertainty and error. (In fact, errors associated with the transmission channel are currently worse for Internet-based services where the telephony voice data is transmitted over a data network).

The invention further provides voice processing apparatus comprising:

an input device which receives spoken input from a user;

a speech recognition unit which converts said spoken input into text equivalent;

a natural language understanding unit which identifies at least two information elements in said text equivalent, each having an uncertainty associated therewith;

a prompt generator which selects a prompt according to which of said at least two information elements has the greatest uncertainty associated therewith; and an output device which plays out said selected prompt to the user.

Such voice processing apparatus may be adapted for connection to the telephone network (conventional PSTN or the Internet), in a customer server kiosk, or in any other appropriate device. Note that the speech recognition means and/or any natural language understanding may or may not be integral to the voice processing system itself (as will be apparent more clearly from the preferred embodiments described below).

The invention further provides a computer readable medium containing instructions readable by a computer system operating as a voice processing system, said instructions including instructions for causing the computer system to perform the following steps:

receiving spoken input from a user;

performing speech recognition to convert said spoken input into text equivalent;

identifying at least two information elements in said text equivalent, each having an uncertainty associated therewith;

selecting a prompt according to which of said at least two information elements has the greatest uncertainty associated therewith; and playing out said selected prompt to the user.

The computer readable medium may comprise a magnetic or optical disk, solid state memory device, tape, or other appropriate storage apparatus. In some cases this medium may be physically loadable into the storage device. In other cases, this medium may be fixed in the voice processing system, and the instructions loaded onto the medium via some wired or wireless network connection. Another possibility is for the medium to be remote from the voice processing system itself, with the instructions being downloaded over a wired or wireless network connection for execution by the voice processing system.

It will be appreciated that the computer program and apparatus of the invention will benefit from substantially the same preferred features as the method of the invention.

BRIEF DESCRIPTION OF THE DRAWINGS

An embodiment of the invention will now be described in detail by way of example only with reference to the following drawings.

DETAILED DESCRIPTION

Figure 1:
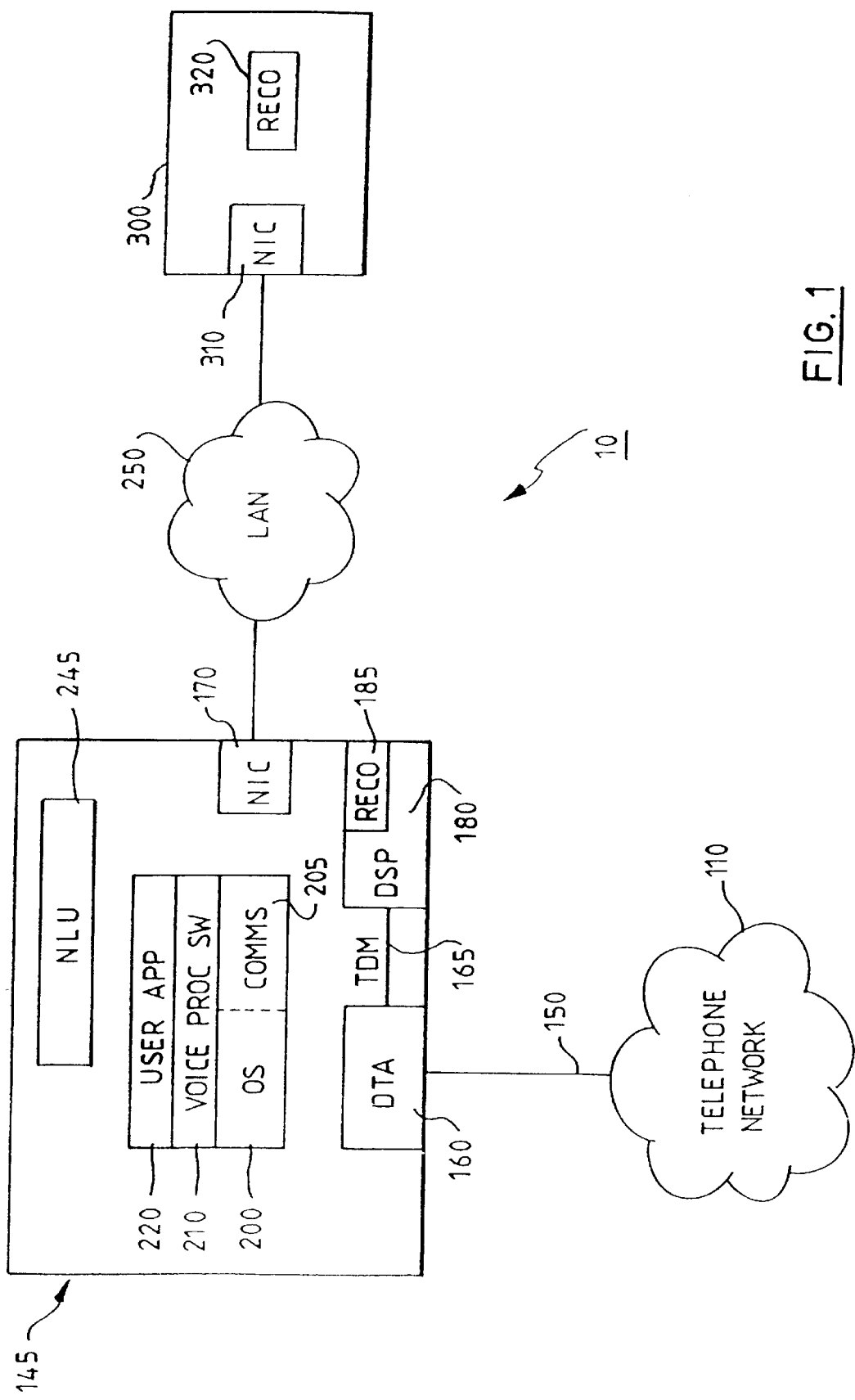
FIG. 1 is a simplified schematic diagram of a voice processing system connected to a remote server.

FIG. 1 illustrates in simplified schematic form the main hardware and software components of a voice processing system 10 having speech recognition functionality. The system 10 is connected to the telephone network 110 by one or more telephony channels 150. In FIG. 1 these are digital trunk lines, each carrying multiple telephony channels (T1 digital trunk lines in North America comprise 24 channels, E1 digital trunk lines in Europe comprise 30 channels). It will be appreciated that in some installations, the digital trunk lines may be connected to the telephone network 110 via a switch or PBX; indeed one possibility is for the voice processing system to be a part of the telephone network itself, providing intelligent services to the network.

The system unit 145 of the voice processing system comprises a computer workstation, which runs an appropriate operating system 200 and a voice processing program 210, which in turn interacts with a user application 220 in order to determine how calls should be processed. The voice processing platform also supports a natural language understanding (NLU) unit 245 which includes dialogue management. The system unit includes one or more digital trunk adapter cards 160 for interfacing to the telephone network 110 via link 150. The system unit also contains a network interface card 170 which allows programs running on the workstation to communicate over a local area network (LAN) 250, using communications software 205 incorporated into the operating system. In addition, the system unit includes a digital signal processing (DSP) card 180, which is connected to the trunk adapter (or adapters) via a time division multiplex (TDM) bus 165. Speech recognition software 185. may be installed as microcode or firmware on the DSP card.

The adapter cards 160 are responsible for interfacing with the telephone network over their respective lines, including signalling, demultiplexing incoming telephony signals, and so on. They may also be used to perform activities such as voice activity detection on a particular telephony channel, compression/decompression of voice signals, and DTMF recognition and generation, although these may be performed on the DSP card instead.

A server system 300 is attached to the LAN 250 via network interface card 310, and supports an operating system and appropriate communications software (not shown), and speech recognition software 320. It will be appreciated therefore that there are two voice recognition resources available to the application 220, the first of these being locally installed on the DSP card 180 in the system unit, and the second voice recognition resource being available remotely via the LAN 250 on server 300.

The voice processing system includes storage (not shown), either as part of system unit 145 or accessible remotely over LAN 250 for storing software such as voice processing program 210, along with ancillary data and prerecorded audio segments for use by application 220. This software can then be loaded and run as required on one or more processors (not shown) in system unit 145.

In one preferred embodiment, the voice processing system is the IBM Voice Response unit (previously known as the DirectTalk voice processing system) available from the IBM Corporation, running on an RS/6000 workstation on top of the AIX operating system. The voice recognition resource comprises a large vocabulary voice recognition system and may, for example, be the ViaVoice engine, available from IBM Corporation. PC-based systems are also available. Likewise, the NLU unit with dialogue management may also be provided by the ViaVoice product.

It will be appreciated that there are many possible variations in the design of the voice processing system of FIG. 1. For example, some voice processing systems accept input from analog lines rather than digital trunks, whilst other voice processing systems are connected to the Internet instead of, or as well as, the conventional telephone network (this provides Voice over IP capability). Some voice processing systems may package the DSP card 185 as a daughter card of the digital trunk adapter 160, thereby eliminating the need for the TDM bus. In addition, the illustrated system has access both to a server voice recognition system, and also to a local DSP recognition system, whereas many voice processing systems will have access to only one such resource. Other voice processing systems may also support text to speech (TTS) as an output mechanism, typically enabled by software running on DSP card 185, although again this may be provided remotely by a server over the LAN. Further, any suitable network could be used for communications between the server and the voice processing system, providing it has suitable transmission characteristics in terms of bandwidth and latency (e.g. one possibility might be to use an ATM connection). Additionally, although the voice processing system illustrated has just a single local DSP resource, some voice processing systems may include multiple DSP cards, with each card supporting multiple recognition programs running simultaneously (or possibly different applications such as TTS). Moreover, although the server approach as shown has the recognition system installed on a separate machine from the line interface unit 160, it would clearly be possible for the software recognition system to be running on the same machine 145 as the line interface unit, provided this machine had sufficient processing capability. Conversely, the NLU unit could run on a separate system from system unit 145, for example, on system 300, or possibly on some other system (not shown) connected to LAN 250. The skilled person will appreciate that such variations are not pertinent to the principles of the present invention.

A typical operation of the voice processing system of FIG. 1 is as follows. An incoming call is received over the telephony network 110, and the voice processing system 10, under the control of the user application 220, may determine that the caller does not have a DTMF telephone (this determination can be made for example through knowledge of the calling or called number, or by the caller failing to depress a tone key when requested to do so). Alternatively, the machine may be configured to use voice recognition for all callers. In any event, the voice processing system proceeds to utilise voice recognition to interpret the caller's input, which is generally received in response to an outgoing prompt from the voice processing system. The caller input is forwarded to a speech recognition resource. For use of the local resource, this leads to a channel on the trunk adapter 160 being connected with a channel on the DSP card 180 via the TDM bus 165. Access to the remote resource can be achieved for example using the approach described in GB 2325110, which is incorporated herein by reference. (Note that the TDM bus connection as shown in FIG. 1 provides a uni-directional data flow, so that as is well-known in the art, a pair of such connections are needed to support a full duplex telephone conversation).

The speech recognition system processes the received audio signal, and returns the spoken string to the user application 220. It will be noted that the large majority of voice recognition systems used in telephony are speaker independent; in other words, such systems are trained to recognise vocal input from any speaker. This is accomplished by training the machine on vocal samples from a representative set of speakers. The recognition unit also returns other information in addition to the recognised string, in particular the statistical confidence level. Additional data may also be returned, such as possible alternative results and so on. Where appropriate, this text is first analysed by the NLU unit 245 to extract relevant meaning, before being supplied to the user application. This then leads to further processing of the call in accordance with the determined caller input. For example, if the caller has spoken a numerical sequence corresponding to an account number, it may provide the caller with the ability to access account information; if the caller has spoken a particular name, it may transfer the caller to the telephone extension for that name. Another possibility is to continue the caller dialogue by playing further prompts to the caller. The dialogue management facility in NLU unit 245 allows such prompts to be constructed on the fly to reflect the caller input.

Figure 2:
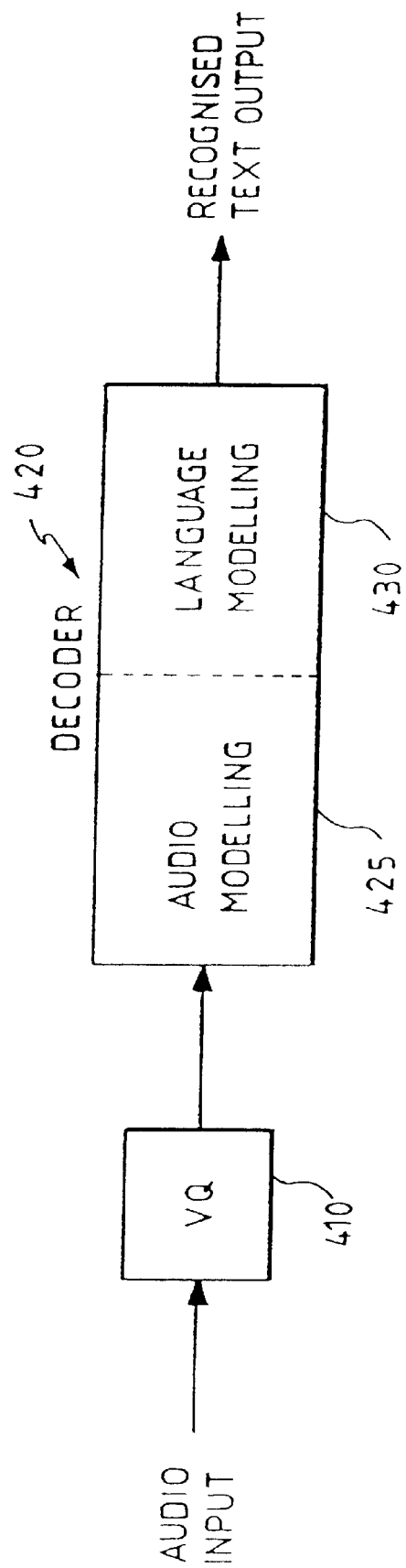
FIG. 2 is a simplified schematic diagram of a speech recognition system for use in or with the voice processing system of FIG. 1.

FIG. 2 illustrates a simple schematic diagram of a typical voice recognition system such as might be used in the voice processing system of FIG. 1. Thus the recognition system receives digitised audio input, which in the case of a telephone signal will generally comprise 8 bit samples at 8 kHz (corresponding to a total data rate of 64 kbit/s). These samples are passed to a vector quantisation unit 410, which aggregates them into vectors of typically 10 ms duration (i.e. 80 samples per vector). The vector quantisation unit may be supplied with a so-called alphabet of vectors (known as labels), and replaces each input vector with the label which matches it most closely. Typically there may be about 200 such labels in the vector quantisation alphabet. (N.B. Some recognition systems do not in fact perform any vector quantisation, but work with a parameterisation of the raw input vectors rather than a limited set of labels).

The audio input, now represented as a sequence of vector labels (or parameters), is then passed into a decoder unit 420, which is responsible for converting this sequence into recognised text. The decoder functionality can be broken down into two main components, audio modelling 425, and language modelling 430. The purpose of the audio modeller is to produce a variety of candidate word strings which may match the input sequence of vector labels; the purpose of the language modeller is then to select which of these word strings is the overall best fit to the audio input.

The mathematical basis for this approach is that if A is the audio input, and W the word output, for a given A, we are seeking to find W such that $P(W|A)$ is maximized. Using Bayes' theorem, this can be re-written as $\max(P(W).P(A|W)/P(A))$, and since $P(A)$ is constant for a given observed A, then the problem becomes the maximisation of $P(W).P(A|W)$. Thus the purpose of the audio modeller is effectively to calculate $P(A|W)$ (the probability of producing the observed audio signal from a given word), and the purpose of the language modeller is effectively to calculate $P(W)$ (the a priori likelihood of a candidate word string produced by the audio modeller). The combination of $P(A|W)$ and $P(W)$ can then be used to determine which candidate word string is most likely to correspond to the speech input on an overall basis.

A language modeller typically looks at the likelihood of particular words appearing next to one another in spoken text, which can be used amongst other things to help decide between homophones (different words sounding the same); "new car" is in general much more likely than "knew car". Note that in a telephony environment, language modelling is often simpler because the speaker is constrained to a particular subject matter (such as pizza ordering).

The operation of the acoustic modeller 425 is based on Hidden Markov Models (HMMs). An HMM has a number of states, which it transfers between in a statistically determined fashion. The states in turn produce outputs, again in a statistically determined fashion. The outputs may be directly observed, but not the underlying states (hence "hidden"). Although implementations vary, one embodiment of a voice recognition HMM has states corresponding to some phonetic speech unit such as a phoneme, and the outputs corresponding to the vector labels. The recognition task is then to determine the series of states (i.e. phonetic units) most likely to have produced the observed vector label sequence. The resulting sequence of phonetic units can then be transformed into text, effectively via an inverted dictionary (a conventional dictionary that includes pronunciation provides phonetic representation for text; the reverse is required here).

Further details about HMMs, particularly in speech applications, can be found in "A tutorial on Hidden Markov Models and Selected Applications in Speech Recognition" by L Rabiner, p257–286, Proceedings of the IEEE, Vol 77, Number 2, February 1989; "Hidden Markov models for automatic speech recognition: theory and application" by S J Cox, p105–115, British Telecom Technological Journal, Vol 6, Number 2, April 1988; "Hidden Markov Models for Speech Recognition" by X Huang, Y Ariki, and M Jack, Edinburgh University Press, 1990 (ISBN 0 7486 0162 7); "Speech Recognition—The Future Now", edited by M Koerner, Prentice Hall, 1996; and "Statistical Methods for Speech Recognition" by F Jelinek, MIT Press, 1997.

It will be appreciated from the above that speech recognition is based on the use of probabilistic/statistical models. This in turn means that a confidence level can be assigned to any given result, and indeed, conventional speech recognition systems do return some such indication of reliability with recognised text.

Figure 3:
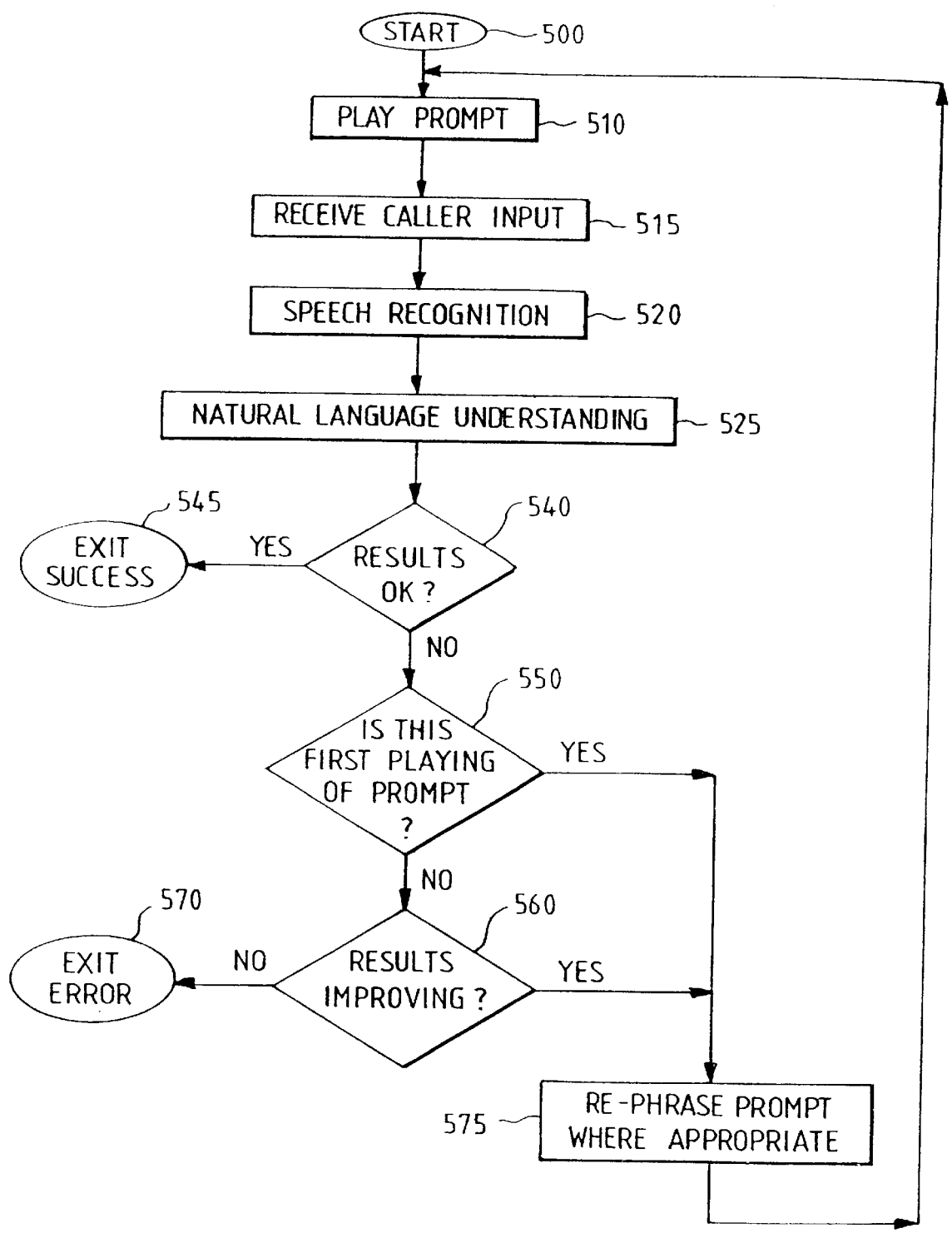
FIG. 3 is a schematic flow chart illustrating the method of operation of the system of FIG. 1 in a preferred embodiment of the invention.

A method of operation of the system of FIG. 1 in accordance with a preferred embodiment of the invention is illustrated in the flow chart of FIG. 3. At the start of the method (step 500), it is assumed that the voice processing system has a call in progress with a caller, and therefore plays a prompt to the caller (step 510) (there may already have been some dialogue on this call). The caller response is duly received (515) and passed to the speech recognition unit for conversion to text (step 520). This is then processed by the NLU unit (step 525) in order to extract the pertinent information, which is returned to the application. The application then examines the received information (step 540) to determine whether or not it is clear and complete. If so, the method can proceed to a successful conclusion (step 545), which involves additional processing not relevant to the present invention.

As an example, in a pizza ordering application, it may be necessary to determine both the size of pizza that the caller wants (small, medium or large), and also the topping. The positive branch from step 540 is taken when both of these pieces of information have been determined with high confidence, i.e. the confidence, reflecting the performance of the speech recognition unit, is above some predetermined threshold. For example, in one embodiment this may occur when the confidence score (which is indicative of the likelihood of the text having been correctly recognised) is above 85%. If on the other hand, the test in step 540 is negative, then the further processing depends on whether or not this is the first playing of the prompt (step 550).

Assuming the prompt has only been played once, the system then proceeds to step 575, which involves re-phrasing the prompt. The objective here is to emphasise to the caller that part of the order which is least certain (has lowest confidence), in order to try to improve the overall recognition accuracy. Thus returning to the pizza ordering application above, if the caller is believed to have ordered a large, pepperoni pizza, the following two options might be available:

(A) "Please say Yes if you want a large pizza with pepperoni; if not, please repeat the TOPPING on the pizza and the size";

(B) "Please say Yes if you want a pepperoni pizza which is large; if not, please repeat the SIZE of the pizza and the topping".

(Here the capitalization is meant to indicate stress, typically by increasing the volume and/or lengthening the duration of the marked word).

The application uses prompt (A) if the main uncertainty resides in the topping, or prompt (B) if the main uncertainty resides in the size. The most uncertain term ("pepperoni" or "large") is that which was returned with the lowest confidence from the speech recognition system. Thus by placing the least certain term at the end of the first part of the prompt, it is brought to the particular attention of the caller. If a mistake has been made, the caller is focused on that element which is most likely to be incorrect. This ordering also makes it easier for the caller to quickly understand the prompt, and so improves the naturalness and speed of the caller dialogue.

The method now loops back up to the top to play the prompt (step 510), now re-phrased of course, and then proceeds down to step 540 as before. Following through the above example, if the caller makes a simple confirmation, then this leads directly to a successful exit (step 545) (in general, mere confirmation is easy to recognise accurately). On the other hand, if the outcome of step 540 is negative, then step 550 will likewise test negative (this being the second run through), in which case a comparison is made (step 560) of some metric for the results for this prompt against those for the preceding prompt. In one preferred embodiment, this metric simply represents the confidence in the recognition results. If the results have deteriorated from those obtained with the previous prompt, then the method exits with error (step 570). In this case the caller should typically be passed to a human agent for handling. Otherwise, the method passes to step 575 and loops as before. Although a positive outcome to step 560 forces continuously improving results, so that eventually step 540 should test positive leading to a successful exit (step 545) (or alternatively of course a negative result to step 560 would lead to unsuccessful termination at step 570), it may also be desirable to include before step 575 an iteration counter. In this case, once the prompt has been tried (in whatever format) a predetermined number of times without successful exit, then the system would automatically go to the unsuccessful exit (step 570).

Returning to the above example, we can see how the method handles a negative input from the caller to prompt (A) or (B) as set out above. Thus perhaps a caller in response to prompt (A) states: "No, I want a large pizza with GREEN PEPPERS" (the capitalization again indicating the potential caller stress pattern, which is likely to be directed by the prompt structure to the element of uncertainty). If this is correctly recognised, then the confidence associated with this result should be better than the original (incorrect) transcription, so that the test at step 560 should prove positive. The method can then proceed to step 575, where the prompt is re-phrased as:

(A') "Please confirm that you want a large pizza with green peppers; if not, please repeat the TOPPING on the pizza and the size".

(Note that here the topping is still regarded as the uncertain element since it has changed from the original prompt, irrespective of the respective confidence values for size and topping the second time around). This prompt should then lead in due course to a successful conclusion of the order (step 545). On the other hand, if the caller input is again misinterpreted then in general the confidence is likely to drop, because it is expected that the second time the caller input will be more carefully enunciated (and therefore less compatible with an incorrect recognition). In most cases therefore this will lead directly to an exit with error (step 570).

It will be appreciated that there are many possible variations on the method depicted in FIG. 3. For example, the flowchart has been discussed primarily with regard to the identification of only two information elements, but of course, the system could be trying to acquire any number (greater than one). In addition, the test of step 540 could be combined into the test of step 560, to provide three possible outcomes: successful exit (step 545), unsuccessful exit (step 570), or rephrase prompt (step 575). The effect of this in combination with the test of step 550 would be that the method always looped at least once; in other words, some form of confirmatory prompt is always provided.

Furthermore, the act of re-phrasing the prompt (step 575), which is primarily to emphasise the element (or elements) of information most in doubt, may be accomplished by a variety of means. For example, stressing the uncertain element can be achieved by re-ordering the prompt words, increasing word volume or duration, inserting pauses at strategic locations, or changing pitch. One, some or all of these techniques can be employed, using a variety of methodologies. Their implementation depends on the facilities available on the voice processing system. Word re-ordering can be performed by pre-recording multiple versions of prompts, or by assembling prompts from suitably atomic segments (for example with the use of a dialogue manager), or by use of text to speech synthesis. Increasing volume or inserting pauses to emphasise can be readily provided by conventional voice processing functionality. Techniques for increasing duration without affecting pitch are well-known in the art (see for example GB 2305830); conversely, these can then be combined with simple changes to the sample frequency to provide pitch changes at constant duration. Alternative processing techniques for changing pitch include linear predictive coding (LPC) (if not already in this format), followed by re-synthesis with a suitably tailored excitation frequency.

Note also that although the comparison of step 560 was based on confidence alone, other factors could also be employed, such as the pitch or volume of the relevant words. If these change significantly, then this may indicate some prosodic stress by the caller who is perhaps trying to indicate that some particular element has not been correctly understood by the system. For example, if prompt (A) above is used, and the caller response shows significant difference in the word recognised as "large", this may possibly suggest that this word has been incorrectly recognised as well—why else would the caller try to draw attention to it. Having said that, factors such as pitch, duration, etc can be sensitive to simple word order, without any particular stressing intended, and such a result needs to be interpreted cautiously.

A further factor that could be considered when re-phrasing is the relative importance of the multiple information elements to be confirmed with the user. For example, in a hotel booking application, the name of the guest and number of nights' stay must be acquired correctly, whereas the title of the morning newspaper such a guest wants is of secondary importance.

Reviewing now the system shown in FIG. 1, it will be appreciated that the recognition system and/or the NLU unit may not be included in the voice processing system of the invention, but rather may be supplied by some external componentry. Alternatively, the recognition system and/or the NLU unit may be part of or integral to the voice processing system. The NLU unit may also be included as part of the user application 220, the voice processing program 210, or the speech recognition system. A further possibility is for the system to provide support for DTMF input in parallel with speech input. For example, confirmation of a recognised order might be performed by hitting a particular DTMF key (a very reliable form of input).

Furthermore, although the system of the present invention has been described primarily in terms of a telephony environment, it is not so limited. For example, it might be included in an automatic kiosk, or in an in-car navigation and control unit. It will therefore be recognised that the system of the present invention may find utility in a great variety of voice processing applications utilising speech recognition.

What is claimed is:

1. A method of operating a voice processing system comprising the steps of:
   receiving spoken input from a user;
   performing speech recognition to convert said spoken input into a digital equivalent;
   identifying at least two information elements in said digital equivalent, each having an uncertainty associated therewith;
   selecting a prompt containing said at least two information elements and emphasizing one of said at least two information elements that has the greatest uncertainty associated therewith; and
   playing out said selected prompt to the user.

2. The method of claim 1, wherein said prompt is selected from a set of two or more possible prompts, each possible prompt containing the same information but having different emphasis.

3. The method of claim 2, wherein the different emphasis is achieved by varying prompt word order.

4. The method of claim 2, wherein the different emphasis is achieved by varying the volume of one or more words in the prompt.

5. The method of claim 2, wherein the different emphasis is achieved by varying the duration of one or more words in the prompt.

6. The method of claim 2, wherein the different emphasis is achieved by varying the pitch of one or more words in the prompt.

7. The method of claim 1, wherein said uncertainty for an information element is based on the speech recognition confidence level associated with that information element.

8. The method of claim 1, further comprising the steps of:
   receiving a second spoken input from said user;
   performing speech recognition to convert said second spoken input into a second text equivalent;
   identifying at least two information elements in said second text equivalent, each having an uncertainty associated therewith;
   and reaching an error condition if the uncertainty associated with the at least two information elements in said second text equivalent is greater than that for the at least two information elements in said text equivalent.

9. The method of claim 1, in which said voice processing system and said user communicate with each other over a telephone network, whereby said spoken input is received over a telephone connection, and said prompt is played out over the telephone connection.

10. Voice processing apparatus comprising:
    an input device which receives spoken input from a user;
    a speech recognition unit which converts said spoken input into a digital equivalent;
    a natural language understanding unit which identifies at least two information elements in said digital equivalent, each having an uncertainty associated therewith;
    a prompt generator which selects a prompt containing said at least two information elements and emphasizing one of said at least two information elements that has the greatest uncertainty associated therewith; and
    an output device which plays out said selected prompt to the user.

11. The apparatus of claim 10, wherein said prompt is selected from a set of two or more possible prompts, each possible prompt containing the same information but having different emphasis.

12. The apparatus of claim 11, wherein the different emphasis is achieved by varying prompt word order.

13. The apparatus of claim 11, wherein the different emphasis is achieved by varying the volume of one or more words in the prompt.

14. The apparatus of claim 11, wherein the different emphasis is achieved by varying the duration of one or more words in the prompt.

15. The apparatus of claim 11, wherein the different emphasis is achieved by varying the pitch of one or more words in the prompt.

16. The apparatus of claim 10, wherein said uncertainty for an information element is based on the speech recognition confidence level associated with that information element.

17. The apparatus of claim 10, wherein said apparatus further receives a second spoken input from said user, said speech recognition unit converting said second spoken input into a second text equivalent, and said natural language unit identifying at least two information elements in said second text equivalent, each having an uncertainty associated therewith; and wherein said apparatus reaches an error condition if the uncertainty associated with the at least two information elements in said second text equivalent is greater than that for the at least two information elements in said text equivalent.

18. The apparatus of claim 10, in which said input and output devices are connected to a telephone network to allow said apparatus to communicate with said user, whereby said spoken input is received over a telephone connection, and said prompt is played out over the telephone connection.

19. A computer readable medium containing instructions readable by a computer system operating as a voice processing system, said instructions including instructions for causing the computer system to perform the following steps:
    receiving spoken input from a user;
    performing speech recognition to convert said spoken input into a digital equivalent;
    identifying at least two information elements in said digital equivalent, each having an uncertainty associated therewith;
    selecting a prompt containing said at least two information elements and emphasizing one of said at least two information elements that has the greatest uncertainty associated therewith; and
    playing out said selected prompt to the user.

20. The medium of claim 19, wherein said prompt is selected from a set of two or more possible prompts, each possible prompt containing the same information but having different emphasis.

21. The medium of claim 20, wherein the different emphasis is achieved by varying prompt word order.

22. The medium of claim 20, wherein the different emphasis is achieved by varying the volume of one or more words in the prompt.

23. The medium of claim 20, wherein the different emphasis is achieved by varying the duration of one or more words in the prompt.

24. The medium of claim 20, wherein the different emphasis is achieved by varying the pitch of one or more words in the prompt.

25. The medium of claim 19, wherein said uncertainty for an information element is based on the speech recognition confidence level associated with that information element.

26. The medium of claim 19, said instructions further including instructions for causing the computer system to perform the following steps:
    receiving a second spoken input from said user;
    performing speech recognition to convert said second spoken input into a second text equivalent;

identifying at least two information elements in said second text equivalent, each having an uncertainty associated therewith;

and reaching an error condition if the uncertainty associated with the at least two information elements in said second text equivalent is greater than that for the at least two information elements in said text equivalent.

27. The medium of claim 19, in which said voice processing system and said user communicate with each other over a telephone network, whereby said spoken input is received over a telephone connection, and said prompt is played out over the telephone connection.

* * * * *